(12) United States Patent
Smith et al.

(10) Patent No.: US 7,606,712 B1
(45) Date of Patent: *Oct. 20, 2009

(54) SPEECH RECOGNITION INTERFACE FOR VOICE ACTUATION OF LEGACY SYSTEMS

(75) Inventors: Steven G. Smith, Roswell, GA (US); Ralph J. Mills, Atlanta, GA (US); Roland T. Morton, Jr., Atlanta, GA (US); Mitchell E. Davis, Palmetto, GA (US)

(73) Assignee: AT&T Intellectual Property II, L.P., New York, NY (US)

( * ) Notice: Subject to any disclaimer, the term of this patent is extended or adjusted under 35 U.S.C. 154(b) by 548 days.

This patent is subject to a terminal disclaimer.

(21) Appl. No.: 09/892,664

(22) Filed: Jun. 28, 2001

(51) Int. Cl.
*G10L 21/00* (2006.01)

(52) U.S. Cl. .................................. 704/270.1

(58) Field of Classification Search ............ 704/270, 704/270.1, 231–235, 9, 275; 705/35; 370/252; 379/88.13
See application file for complete search history.

(56) References Cited

U.S. PATENT DOCUMENTS

| | | | |
|---|---|---|---|
| 4,776,016 A | 10/1988 | Hanson | |
| 4,905,163 A | 2/1990 | Garber et al. | |
| 5,038,283 A | 8/1991 | Caveney | |
| 5,359,649 A | 10/1994 | Rosu et al. | |
| 5,521,958 A | 5/1996 | Selig et al. | |
| 5,570,283 A | 10/1996 | Shoolery et al. | |
| 5,583,937 A | 12/1996 | Ullrich | |
| 5,623,404 A | 4/1997 | Collins et al. | |
| 5,664,110 A | 9/1997 | Green et al. | |
| 5,687,212 A | 11/1997 | Kinser, Jr. et al. | |
| 5,694,323 A | 12/1997 | Koropitzer et al. | |
| 5,696,906 A | 12/1997 | Peters | |
| 5,754,830 A | 5/1998 | Butts | |
| 5,799,279 A * | 8/1998 | Gould et al. | 704/275 |
| 5,805,775 A * | 9/1998 | Eberman et al. | 704/9 |
| 5,812,977 A * | 9/1998 | Douglas | 704/270 |

(Continued)

FOREIGN PATENT DOCUMENTS

EP 0 712 227 5/1996

(Continued)

OTHER PUBLICATIONS

Commercial Speech Recognition (www.tiac.net/users/rwilcox/speech.html).

(Continued)

*Primary Examiner*—Angela A Armstrong

(57) ABSTRACT

Methods and apparatus are disclosed for a technician to access a systems interface to back-end legacy systems by voice input commands to a speech recognition module. Generally, a user logs a computer into a systems interface which permits access to back-end legacy systems. Preferably, the systems interface includes a first server with middleware for managing the protocol interface. Preferably, the systems interface includes a second server for receiving requests and generating legacy transactions. After the computer is logged-on, a request for voice input is made. A speech recognition module is launched or otherwise activated. The user inputs voice commands that are processed to convert them to commands and text that can be recognized by the client software. The client software formats the requests and forwards them to the systems interface in order to retrieve the requested information.

12 Claims, 4 Drawing Sheets

U.S. PATENT DOCUMENTS

| | | | |
|---|---|---|---|
| 5,826,270 A | 10/1998 | Rutkowski | |
| 5,848,403 A | 12/1998 | Gabriner et al. | |
| 5,857,201 A | 1/1999 | Wright et al. | |
| 5,873,070 A | 2/1999 | Bunte | |
| 5,884,262 A | 3/1999 | Wise | |
| 5,884,266 A | 3/1999 | Dvorak | |
| 5,896,440 A | 4/1999 | Reed et al. | |
| 5,909,492 A | 6/1999 | Payne | |
| 5,915,001 A * | 6/1999 | Uppaluru | 379/88.22 |
| 5,920,846 A | 7/1999 | Storch et al. | |
| 5,923,735 A | 7/1999 | Swartz et al. | |
| 5,931,917 A | 8/1999 | Nguyen et al. | |
| 5,953,389 A | 9/1999 | Pruett | |
| 5,960,411 A | 9/1999 | Hartman et al. | |
| 5,963,940 A * | 10/1999 | Liddy et al. | 704/9 |
| 5,970,472 A | 10/1999 | Allsop | |
| 5,974,135 A | 10/1999 | Breneman et al. | |
| 6,023,683 A | 2/2000 | Johnson et al. | |
| 6,023,684 A * | 2/2000 | Pearson | 705/35 |
| 6,026,379 A | 2/2000 | Haller et al. | |
| 6,035,285 A | 3/2000 | Schect | |
| 6,052,785 A | 4/2000 | Lin | |
| 6,058,373 A | 5/2000 | Blinn | |
| 6,080,202 A | 6/2000 | Strickland | |
| 6,081,789 A | 6/2000 | Purcell et al. | |
| 6,092,192 A | 7/2000 | Kanevsky | |
| 6,101,472 A * | 8/2000 | Giangarra et al. | 704/275 |
| 6,101,510 A | 8/2000 | Stone | |
| 6,115,040 A | 9/2000 | Bladow | |
| 6,115,737 A | 9/2000 | Ely | |
| 6,223,541 B1 | 5/2001 | Farrag | |
| 6,226,623 B1 | 5/2001 | Schein | |
| 6,233,541 B1 | 5/2001 | Butts | |
| 6,311,178 B1 | 10/2001 | Bi | |
| 6,324,522 B2 | 11/2001 | Petersen et al. | |
| 6,341,271 B1 | 1/2002 | Salvo et al. | |
| 6,366,829 B1 | 4/2002 | Wallace et al. | |
| 6,389,337 B1 | 5/2002 | Kolls et al. | |
| 6,396,833 B1 | 5/2002 | Zhang | |
| 6,445,774 B1 | 9/2002 | Kidder | |
| 6,473,407 B1 * | 10/2002 | Ditmer et al. | 370/252 |
| 6,487,278 B1 * | 11/2002 | Skladman et al. | 379/88.13 |
| 6,539,548 B1 | 3/2003 | Hendricks | |
| 6,578,005 B1 | 6/2003 | Lesaint et al. | |
| 6,587,822 B2 * | 7/2003 | Brown et al. | 704/275 |
| 6,587,851 B1 | 7/2003 | Ditcharo | |
| 6,598,167 B2 | 7/2003 | Devine | |
| 6,636,831 B1 | 10/2003 | Profit | |
| 6,671,824 B1 | 12/2003 | Hyland | |
| 6,724,406 B1 | 4/2004 | Kelley | |
| 6,736,376 B1 | 5/2004 | Delisle | |
| 6,738,815 B1 * | 5/2004 | Willis et al. | 709/225 |
| 6,763,376 B1 | 7/2004 | Devine | |
| 6,971,072 B1 | 11/2005 | Stein | |
| 7,111,243 B1 * | 9/2006 | Ballard et al. | 715/744 |
| 2001/0016819 A1 | 8/2001 | Kolls | |
| 2002/0099642 A1 | 7/2002 | Schwankl | |
| 2002/0103906 A1 | 8/2002 | Knight | |
| 2002/0138656 A1 | 9/2002 | Hickey | |
| 2003/0006913 A1 | 1/2003 | Joyce | |
| 2003/0008661 A1 | 1/2003 | Joyce | |
| 2003/0023601 A1 | 1/2003 | Fortier et al. | |
| 2003/0046397 A1 | 3/2003 | Trace | |
| 2003/0125956 A1 * | 7/2003 | Lewis et al. | 704/275 |
| 2003/0139932 A1 | 7/2003 | Shao | |
| 2004/0014479 A1 | 1/2004 | Milman | |
| 2004/0209602 A1 | 10/2004 | Joyce | |

FOREIGN PATENT DOCUMENTS

| | | |
|---|---|---|
| EP | 0732850 | 9/1996 |
| JP | 2000112746 A | 4/2000 |

OTHER PUBLICATIONS

IBM Voice Systems (www-4.ibm.com/software/speech).
IBM Voice Systems (www-4.ibm.com/software/speech/enterprise).
IBM Voice Systems (www-4.ibm.com/software/speech/enterprise/ms_0.html).
Metroplex Voice Computing, Inc. (www.metroplexvoice.com).
Metroplex Voice Computing, Inc. (www.metroplexvoice.com/toc.htm).
Metroplex Voice Computing, Inc. (www.metroplexvoice.com/news.htm).
Metroplex Voice Computing, Inc. (www.metroplexvoice.com/products.htm).
Metroplex Voice Computing, Inc. (www.metroplexvoice.com/medical_speech_recognition.htm).
Voice Recognition Systems Home Page (www.iglou.com/vrsky/rightframe.htm).
Lernout & Hauspie (www.lhsl.com/default2.htm).
Lernout & Hauspie, "The Language of Business" (www.lhsl.com/business).
Lernout & Hauspie, "Voice Xpress" (www.lhsl.com/voicexpress).
TMA Associates (www.tmaa.com).
TMA Associates, Editor's Notes (May 2000) (www.tmaa.com/voice_web.htm).
Fonix (www.fonix.com).
Dragon Systems Inc.: Dragon Naturally Speaking Preferred Edition (www.zdnet.com/pcmag/features/speech/rev1.html).
Nuance Verifier 2.0 (www.nuancecom.com/products/verifier.html).
Nuance Vocalizer (www.nuancecom.com/products/vocalizer.html).
Nuance 7.0 (www.nuancecom.com/products/nuance7.html).
Nuance (www.nuancecom.com).
Nuance Powers the Voice Web (www.nuancecom.com/partners/voiceweb.html).
Nuance Product Offering (www.nuancecom.com/products/products.html).
Nuance Voyager (www.nuancecom.com/products/voyager.html).
Nuance Solutions (www.nuancecom.com/solutions/solutions.html).
Nuance Enterprise Solutions (www.nuancecom.com/solutions/enterprise.html).
Nuance Telecom Solutions (www.nuancecom.com/solutions/telecom.html).
Nuance Internet Solutions (www.nuancecom.com/solutions/internet.html).
Nuance Services (www.nuancecom.com/services/services.html).
Nuance Speech Application Design and Development (www.nuancecom.com/services/speech_application_design.html).
Delivering Speech Technologies with the Fonix FAAST® Framework, Part I (a white paper), Feb. 2001.
No author; FieldCentrix Selects BellSouth's Intelligent Wireless Network to Bring Wireless Data Solution to Field Service Companies, Aug. 24, 1999; BusinessWire; pp. 1-2.
Moran et al.; "Multimodal User Interfaces in the Open Agent Architecture", Proceedings of the 2nd International Conference on Intelligent User Interfaces, Aug. 1996.
Conversay "Speech Technology Solutions", White Paper C 2001.
"Return on Investment Model", web.archive.org webpage of Norand.com, Feb. 6, 1998, pp. 1-5.
"Norand-Payback", web.archive.org webpage of Norand.com, Feb. 6, 1998, pp. 1-2.
"Norand-Products", web.archive.org webpage of Norand.com, Feb. 6, 1998, pp. 1-5.
"Norand-Case Study", web.archive.org webpage of Norand.com, Feb. 1998, pp. 1-3.
Haugen, Dyan L.; Hill, Arthur V; "Scheduling to Improve Field Service Quality", Summer 1999, Decision Sciences, 30, 3: ABI/Inform Global, pp. 783-804.
Freedman, David H; "Case Study: Gas Attack", Aug. 25, 1997, Forbes ASAP Supplement, pp. 45-52, Dialog 01485548 01-36536.
McCarthy, Vince, "The Transformation of the Public Network", Mar. 20, 1995, Telephone, v228n12, pp. 88-100, Dialong 0100552196-54914.

Paz, Noemi M; Leigh, William; "Maintenance scheduling: Issues, results and research needs", 1994, International Journal of Operations & Production Management, v14n8, pp. 47-69, Dialog 00956565 96-05958.

Tseng, Paul C; Lewis, Malcom; "Best Practices and Design Tips", Apr. 1999, Contracting Business, v56, n4, p. 2s84(1), Dialog 06305741 54514903.

Jewett, Dale,; "Service Call", Jul. 21, 1997, Automotive News, p. 61, Dialog 05140584 47847132.

Southerland, Randy; "Not your typical garbagemon", Feb. 2000, Waste Age, 31, 2, ss50, Dialog 11970477 60110303.

"The Luxury Class Database", Apr. 3, 1995, InformationWeek, n 521, p. 100+, Dialong 00593604 23168942.

Ivey, Mike; "Cub: Toughen Penalties vs. Ameritech", Sep. 7, 2000, Madison Captial Times, Madison, Wisconsin, p. 1E, ProQuest ID 59714682.

Jaffe, Charles; "Gas Supplier takes timing seriously if delivers are late, the product is free". Feb. 5, 1989. The Morning Call, Allentown, PA, p. D.01, ProQuest ID 92485879.

Lister, Karen; "Improvements cited in Portland cable service", Jul. 21, 1995, Corpus Christi Caller Times, Corpus Christi, TX., Sec. B, p. 2, ProQuest 6892257.

"Norand-Field Service", web.archive.org webpage of Norand.com., Feb. 6, 1998, pp. 1-2.

"Norand-Training", web.archive.org webpage of Norand.com., Feb. 6, 1998, pp. 1-2.

Wood, Michael; "Fighting the paperwork nemesis", Mar. 1996, American Gas, v78n2, pp. 32-33, Dialog 01179245 98-28640.

"Powering better customer service. (Boston Edison implements mobile computing solution)", May 1997, Communication News, v34, 5n, p. 50(2) Dialog 02070908 19414033.

Kosseff, Jeffrey; "Service Delays May Lead to AT&T Fine", Jul. 18, 2001, The Oregonian, Portland, OR., p. C.01. ProQuest ID 75527844.

Office Action dated Jun. 14, 2006; U.S. Appl. No. 09/892,665, filed Jun. 28, 2001.

Office Action dated Feb. 14, 2008; U.S. Appl. No. 09/982,665, filed Jun. 28, 2001.

Office Action dated Jan. 15, 2004; U.S. Appl. No. 09/892,665, filed Jun. 28, 2001.

Office Action dated Dec. 12, 2006; U.S. Appl. No. 09/892,665, filed Jun. 28, 2001.

Office Action dated May 16, 2007; U.S. Appl. No. 09/892,665, filed Jun. 28, 2001.

Office Action dated Jul. 1, 2008; U.S. Appl. No. 09/892,665, filed Jun. 28, 2001.

Office Action dated Jan. 12, 2009; U.S. Appl. No. 09/892,665, filed Jun. 28, 2001.

U.S. Appl. No. 09/892,665, filed Jun. 28, 2001.

* cited by examiner

SPEECH RECOGNITION INTERFACE FOR VOICE ACTUATION OF LEGACY SYSTEMS

FIELD OF THE INVENTION

The present invention relates generally to the field of telecommunications dispatching and, more particularly, to methods and apparatus for providing a user-friendly input to a systems interface to legacy systems.

BACKGROUND OF THE INVENTION

Telecommunications technicians, such as so-called "Installation and Maintenance" (I&M) technicians, may visit customer sites to install new equipment, set up new services, or to service existing equipment or services. Frequently, I&M technicians need certain information stored on back-end legacy systems to perform a job order. The legacy systems may include dispatch, facilities, and billing systems. The legacy systems may store information such as job assignment, facility assignment, network testing functions, maintenance processes, and customer-specific information.

A typical telephone company, for example, can have a number of such back-end legacy systems that I&M technicians may need to access to perform job orders. These legacy systems can include, for example, a loop facility assignment control system, a loop maintenance operations system, a computer system for main frame mainframe operations, a mechanized loop testing system, a secure network element contract server, a mechanized time reporting system, and a work activity statistical sampling According to a previous approach, technicians could access some information from certain legacy systems using a gateway. For example, BellSouth's I&M technicians use the BellSouth Craft Access System (CAS) gateway. However, access using the gateway had significant limitations. The access was dial-up, meaning that the technician often had to tie up a customer's phone line. Additionally, logging-in and accessing data using CAS was a slow, laborious process. For example, CAS access was sometimes provided via Computer Access Terminals (CATs) using a slow 1.2 kbps connection. Because of the drawbacks of CAS, such as its slow speed, the provision of services by I&M technicians was suboptimal because of delays and impediments to getting the information necessary to complete a job order. In addition, CAS was very difficult to improve. The platform did not lend itself to creating new capabilities due to limited memory and low processor speed.

Moreover, I&M technicians often have poor or suboptimal keyboard skills. Technicians seeking information from legacy system interfaces such as CAS sometimes make mistakes in entering their requests into a computer keyboard. These mistakes can generate user errors that may result in the retrieval of incorrect information or that may result in the delayed retrieval of the correct information. Such user errors can increase the amount of time it takes I&M technicians to complete their job orders. This can increase costs and lead to customer dissatisfaction.

SUMMARY OF THE INVENTION

The subject matter presented herein is generally directed to a system and method for permitting a user, such as a technician, to access information stored on back-end legacy systems that substantially obviates one or more of the problems due to the limitations and disadvantages of the prior art.

In an embodiment, a user logs a computer onto a systems interface which permits access to back-end legacy systems. The computer is running client software to access the systems interface. Preferably, the client software is application-specific software such as the "TECHNET client application." Preferably, the systems interface includes a first server with middleware for managing the protocol interface. Preferably, the systems interface includes a second server for receiving requests and generating legacy transactions. Preferably, the systems interface responds to the log-on attempt by presenting an introductory home page, such as a "TECHNET home page." After the computer is logged-on, a request for voice input is made. Preferably, the request results from a technician selecting an icon or engaging a software button on a home page. In response to the request for voice input, a voice recognition module is launched or otherwise activated.

For a system intended to be used by a technician operated entirely by voice, after the power switch is turned on, voice commands such as, for example, "Start Technet", "login BYNKCZF" (common user ID), "password 123abc," can be used to logon and get to Technet home page.

The user inputs voice commands that are processed to select operations and to complete data fields recognized by the client software. The client software formats the requests and forwards them to the systems interface in order to retrieve the requested information.

The advantages of the present invention are numerous. For example, the invention can permit a user, such as a technician, to remotely access information from back-end legacy systems using a voice input to a systems interface instead of making entries on a keyboard. The voice input to the computer can be made over a wireline or over a wireless communications network. Using a voice input to the systems interface can reduce difficulties arising from keyboard entry errors. Using a voice input can also free up the technician to tend to other tasks and thereby improve his efficiency. Using a voice input can reduce costs and improve customer satisfaction.

DETAILED DESCRIPTION OF THE INVENTION

Figure 1:
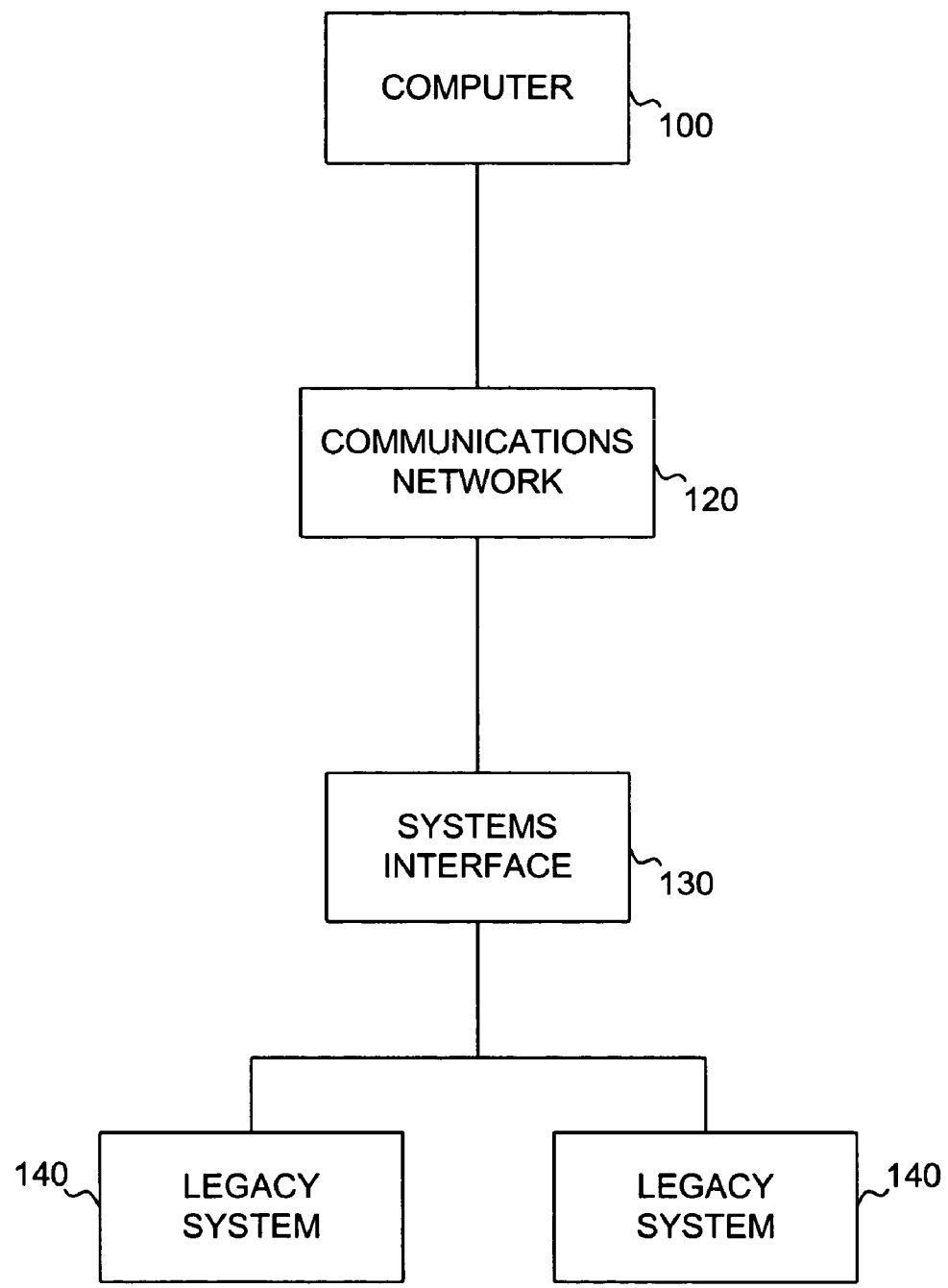
FIG. 1 is a schematic block diagram of a system for allowing users to access information from back-end legacy systems according to an embodiment of the invention.

FIG. 1 is a schematic block diagram of an exemplary system for allowing a user, such as a technician, to access information from back-end legacy systems according to an embodiment of the invention. The system of FIG. 1 includes computer 100, communications network 120, systems interface 130, and back-end legacy systems 140.

Computer 100 is a computer used by a technician or other service person in order to access information from back-end legacy systems 140. As used herein, "computer" is used in the broadest sense of the term. A "computer" may be a microcomputer, minicomputer, laptop, personal data assistant, cellular phone, two-way pager, processor, or any computerized device capable of transmitting and receiving data over a shared network. Preferably, computer 100 is a ruggedized laptop computer.

Computer 100 remotely accesses systems interface 130 through communications network 120. Communications network 120 may be any communications network that permits a remote computer to access a remote server. Communications network 120 could be a wireline network, wireless or cellular network, satellite network, and so forth. Preferably, communications network 120 is a Public Switched Telephone Network (PSTN). For example, communications network 120 can be BellSouth Communications Network (BSCN). Alternatively, communications network 120 can be a wireless communications network such as Cingular Wireless Network.

Systems interface 130 provides a systems interface between remote (and preferably portable, e.g., a ruggedized laptop computer) computers 100 seeking data from back-end legacy systems 140. Legacy systems 140 are generally mainframe-type computer systems that maintain data for a company. According to an embodiment, legacy systems 140 may include one or more of the following systems: a loop facility assignment control system; a loop maintenance operations system; a computer system for mainframe operations; a mechanized loop testing system; a secure network element contract server; a mechanized time reporting system; and a work activity statistical sampling plan.

The general operation of the system of FIG. 1 is as follows. A user of computer 100, such as a technician, logs onto systems interface 130 over communications network 120. The computer is running client software that includes a client graphical user interface (GUI) to interface with systems interface 130. After the log-on, systems interface 130 permits computer 100 to submit requests for information from legacy systems 140. The user can submit the requests either by keyboard entry of inputs to the client GUI or by voice inputs to a speech recognition module. After receiving the requests, systems interface 130 processes the requests, generates legacy transactions, receives information from legacy systems 140, and transmits the information back to computer 100.

Figure 2:
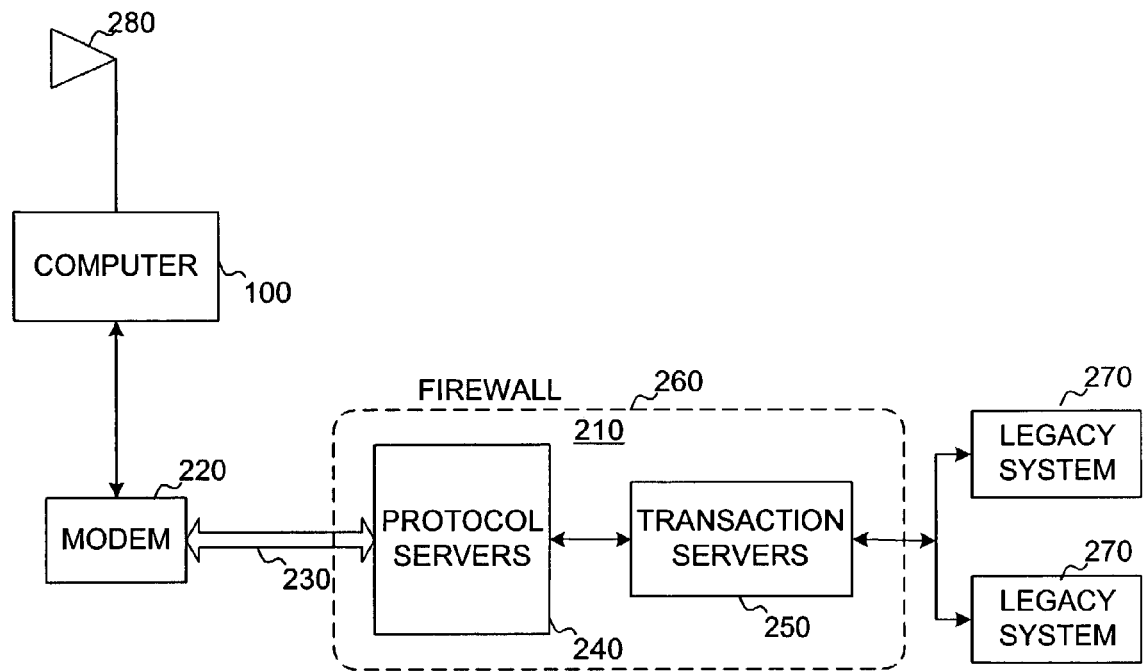
FIG. 2 is a schematic block diagram of a system for allowing users to access information from back-end legacy systems according to an embodiment of the invention.

FIG. 2 is a schematic block diagram of an exemplary preferred system for allowing technicians to access information from legacy systems according to an embodiment of the invention. The system of FIG. 2 includes audio input device 280, computer 200, modem 220, communications network 230, at least one protocol server 240, at least one transaction server 250, firewall 260, and legacy systems 270. Protocol server 240, transaction server 250, and firewall 260 can be collectively referred to as system interface 210.

In accordance with FIG. 2, computer 200 accesses legacy systems 270 via a systems interface including protocol servers 240 and transaction servers 250 protected by firewall 260. Generally, protocol servers 240 provide a protocol and middleware interface between computer 200 and transaction server 250. Protocol servers 240 may receive requests for information or other messages from computer 200; route requests or messages to transaction server 250; receive responsive information from transaction server 250; and route responsive information back to computer 200.

Generally, transaction servers 250 provide an interface to back-end legacy systems 270 so that responsive information can be retrieved. Transaction servers 250 may service requests, generate legacy transactions in response to those requests, and receive responsive information to be forwarded back to protocol servers 240.

The preferred systems interface (e.g., elements 240, 250 and 260 of FIG. 2) is disclosed in the copending, commonly owned, U.S. patent application Ser. No. 09/343,815, entitled "Systems and Methods for Utilizing a Communications Network for Providing Mobile Users Access to Legacy Systems (hereinafter, referred to as "the '815 application"), filed on Jun. 30, 1999, the entirety of which is hereby incorporated by reference. The preferred systems interface is described in the aforementioned application in connection with the disclosed "TECHNET" system.

In particular, the preferred protocol servers 240 are disclosed in the '815 application as the "protocol servers," which may include any associated hardware and/or software disclosed in connection therewith. The preferred transaction servers 250 are disclosed in the '815 application as the "TechNet servers," which may include any associated hardware and/or software disclosed in connection therewith.

Protocol server 240 and transaction server 250 are depicted in FIG. 2 as separate servers for purposes of clarity and illustration. The operations performed by protocol server 240 and transaction server 250 could easily be combined and performed on a single server. On the other hand, the operations performed by protocol server 240 and transaction server 250 could easily be further subdivided and performed on additional servers. It should also be understood that the term "server" is intended to encompass variations such as processor, microprocessor, computer, minicomputer, microcomputer, and so forth.

Audio input device 280 is a device for receiving voice input or other audio input into computer 200. Preferably, audio input device 280 is a microphone that is integrated into computer 200. According to an embodiment, audio input device 280 is a commercially available microphone designed for speech recognition applications, such as a microphone made by Andrea Electronics, Shure Brothers, SSCS, Inc., Telex, Labtec, Norcom Electronics, or VXI Corp. Other commercially available microphones could be used.

Computer 200 is a remote and preferably portable computer used by a technician. Computer 200 may be any of the devices discussed above for computer 100 (FIG. 1). Additionally, computer 200 of FIG. 2 of the instant application may comprise the "TECHNET client PC" disclosed in the '815 application, including any associated hardware and/or software disclosed in connection therewith. Computer 200 may include a memory for storing certain software discussed below. The memory can be internal or external. The memory can include any means for storing software, including a hard disk, an optical disk, floppy disk, ROM (read only memory), RAM (random access memory), PROM (programmable ROM), EEPROM (extended erasable PROM), and so forth.

Communications network 230 may be a wireline communications network, preferably a PSTN. Alternatively, or in addition, communications network 230 may be a wireless or cellular communications network.

Generally, modem 220 and communications network 230 can support transmission rates in the range of about 2-56 kilobits per second, depending on whether the communications link is a wireline link or a wireless link.

Legacy systems 270 is similar to and include any of the variations discussed in connection with legacy systems 140 of FIG. 1.

The general operation of the preferred system of FIG. 2 is now described. A user (e.g., a technician) of computer 200 dials up or otherwise contacts protocol servers 240 via modem 220 and communications network 230. Technician may log in via protocol server 240 to transaction server 250 using a user name and other data, such as a password and/or primary host group address.

Computer 200 can run a client application for accessing the systems interface. Preferably, the computer is running the client application disclosed in the '815 application as the "TECHNET client application." The client application includes a client graphical user interface (GUI) layer that provides the user interface for receiving requests for information from the user, displaying information retrieved from the back-end systems, and other user interface tasks.

Upon log-on, a primary screen or primary home page may be presented to the user of computer 200 by the client GUI. Preferably, this primary home page is a "TECHNET home page" that presents various options for requesting information (referred to herein as "operations") from legacy systems. A technician may make the requests by keyboard entry of inputs to the client GUI. For example, the technician may select a particular operation (e.g., "Retrieve Client Account Information") using a mouse or like pointing device. The technician may then type in the information for a client (e.g., name, address, phone number, account number, and/or social security number, etc.) into client GUI-provided data fields. The client software formats the inputs into requests that are forwarded to the systems interface in order to retrieve the desired information. Other requests for information from the various legacy systems 270 can be initiated by typing in the appropriate information.

Alternatively, the user can opt to make the requests by voice input. After the computer is logged-on, the user makes a request for voice input. Preferably, the request for voice input is made by a technician speaking to the computer to start the application. When the PC is turned on, a speech recognition application is launched or otherwise activated. The user inputs voice commands into audio input device 280 that are processed by the speech recognition application in order to select particular operations and to complete the data fields for those operations. The speech recognition application and the client software are integrated so that voice input selection of a particular operation results in that operation being selected by the client GUI. The two software applications are also integrated so that voice input of information (for the selected operation) is used to complete the data fields presented by the client GUI. As before, the client software formats the inputs into requests that are forwarded to the systems interface in order to retrieve the desired information.

Figure 3:
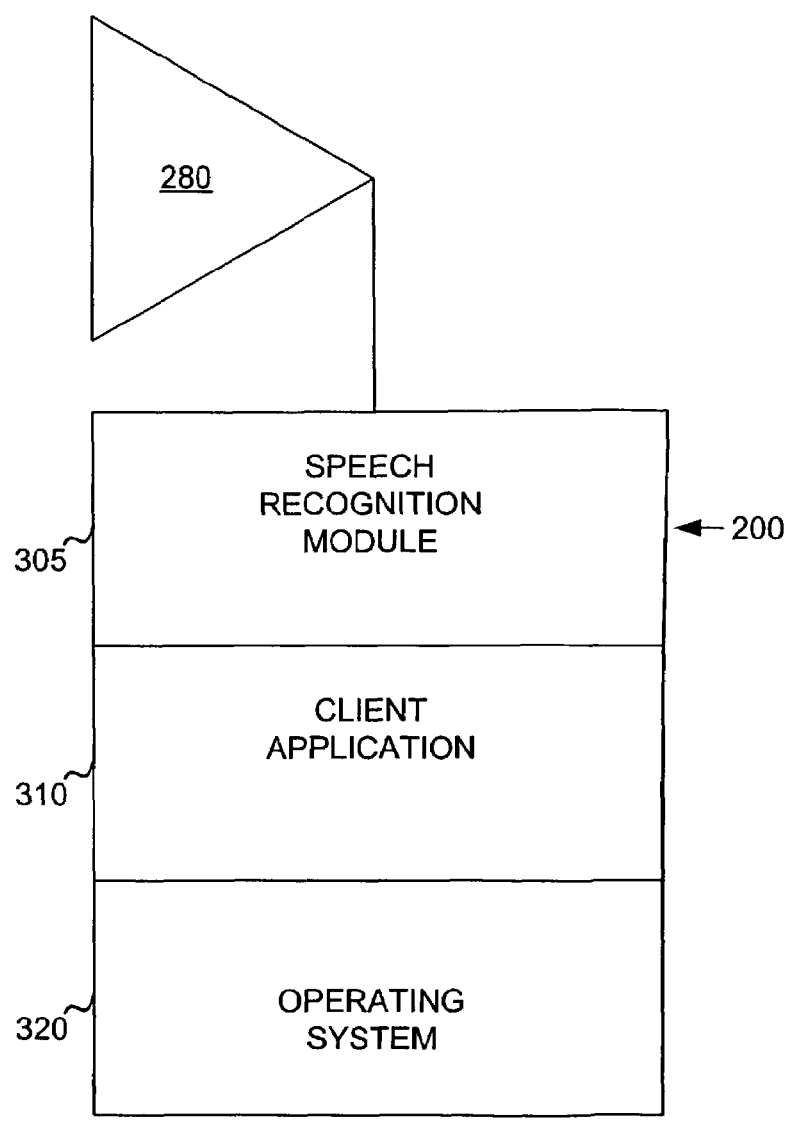
FIG. 3 is a schematic diagram of the software configuration of a computer used in accordance with an embodiment of the invention.

FIG. 3 is a schematic diagram of an exemplary software configuration of a computer used in accordance with the subject matter disclosed herein. To explain and illustrate, FIG. 3 is discussed in connection with structure shown in FIG. 2. However, the software configuration of FIG. 3 is not to be considered as limited or constrained by the structure of FIG. 2 or any other structure.

In the embodiment of FIG. 3, computer 200 is programmed with speech recognition module 305, client application 310, and operating system 320.

Operating system 320 may be a conventional operating system program. One example of suitable operating system is Microsoft Windows 98. Operating system 320 may be any of the other operating systems disclosed in the '815 application.

Client application 310 is the software application that runs on computer 200 to permit the access to legacy systems (e.g., the legacy systems 270 of FIG. 2) via the systems interface (e.g., protocol servers 240 and transaction servers 250 of FIG. 2). Generally, client application 310 recognizes user requests, formats the requests, sends requests to the systems interface, receives retrieved information, and processes retrieved information so that it can be displayed to the user. Preferably, client application 310 is the TechNet client application disclosed in the '815 application. Client application 310 may includes a client GUI layer for managing the user-to-computer interface. Client application 310 may include a communications layer for allowing client application 310 to interact with the systems interface. Preferably, the client GUI layer is the TechNet GUI layer and the communications layer is the TechNet communications layer, both disclosed in the '815 application.

Voice recognition module 305 is the speech recognition software application that runs on computer 200 in order permit the user to present voice input requests to voice input device 280 (FIG. 2). Speech recognition module 305 is capable of performing STT (speech-to-text) operations that translate spoken words into text or other characters or commands. When activated, speech recognition module 305 is capable of recognizing voice inputs for selecting operations and/or for inputting information to complete data fields.

For example, a home page displayed to a user by the client GUI may present options for several operations (e.g., "Get a Job," "Retrieve Client Account Information," and so forth). Speech recognition module 305 is programmed to recognize verbal utterances of these operations, which are translated into a command that selects the corresponding operation in much the same way as if the user had selected the operation with a pointing device.

For example, after selecting a particular operation (e.g., "Retrieve Client Account Information"), the client GUI may present a page with data fields to be completed. Speech recognition module 305 is programmed to translate verbal inputs into text that is used to complete these data fields.

According to one embodiment, speech recognition module 305 has a series of submodules or subcomponents tailored to the various pages that may be presented by the client GUI. For example, the client GUI may be adapted to present a home page presenting several operations, as well as a series of linked pages corresponding to each operation. Speech recognition module 305 may tailor its voice recognition processing according to the active page presented by the client GUI. For example, there may be a separate vocabulary accessed by speech recognition module 305 for each of the pages.

Design and coding of speech recognition module 305 is well within the skill of the ordinary artisan. Currently, a number of speech recognition software applications are commercially available. Such a commercially available application could be programmed or modified or adapted to perform the specific speech recognition operations of the present invention.

Commercially available speech recognition applications include those sold by United Research Labs (e.g., VOICEACTION), Dragon Systems (e.g., NATURALLYSPEAKING and DRAGONDICTATE), IBM (VIAVOICE, Natural Language Understanding, voice-enabled forms technology see, Lernout & Hauspie (e.g., Voice Xpress), Phillips Speech Processing (e.g., FREESPEECH98), Verbex Voice Systems (e.g., Listen for Windows). Preferably, voice recognition module 305 is based on the Nuance 7.0 product sold by Nuance Communications of Menlo Park, Calif. The suite of Nuance products includes API interfaces for various programming languages to enable the development of voice-driven applications. Alternatively, voice recognition module 305 can be coded as a custom application.

Figure 4:
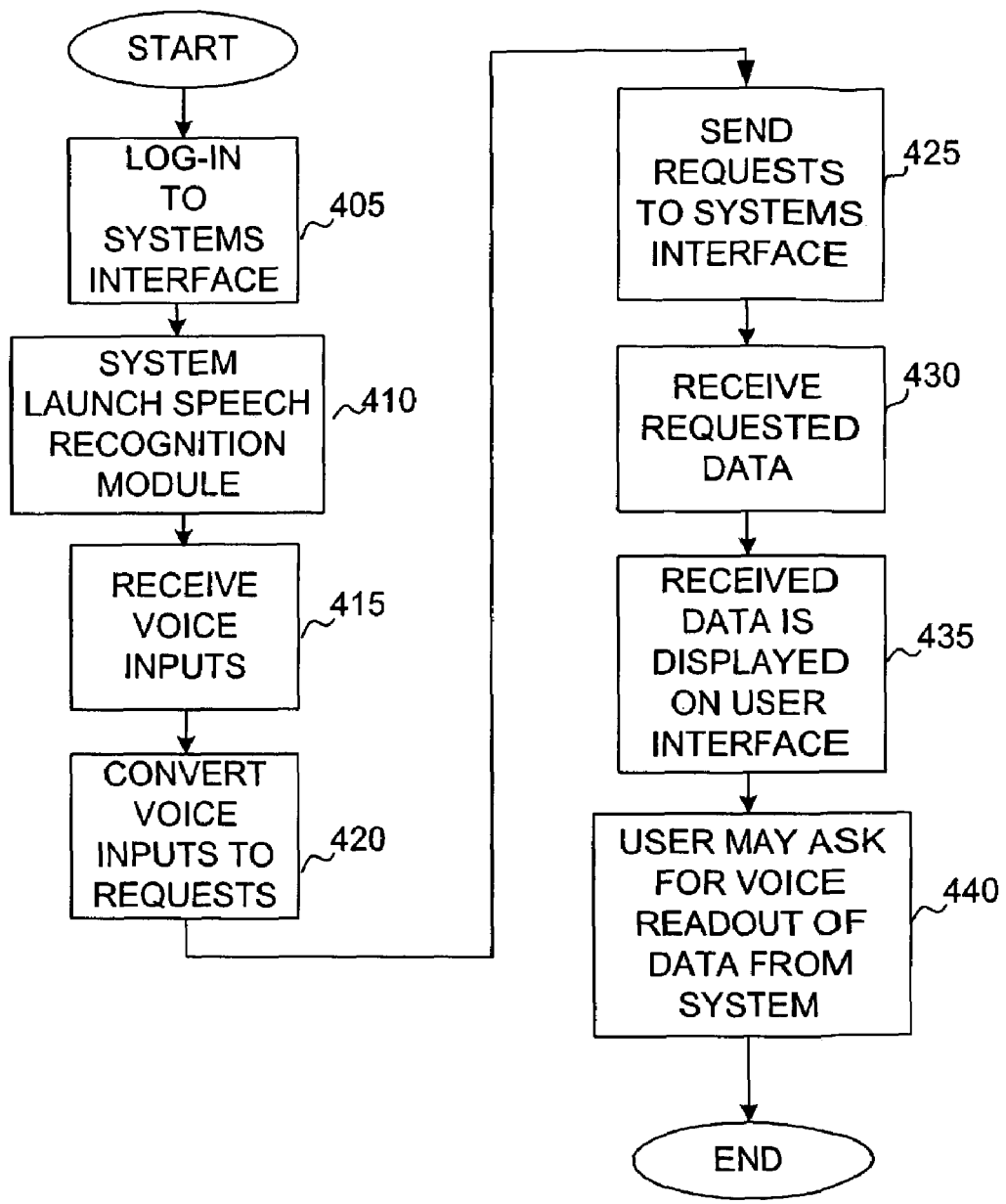
FIG. 4 is a flow diagram of a method for allowing a user to retrieve information from a back-end legacy system using a voice input according to an embodiment of the invention.

FIG. 4 is a flow diagram of a method for allowing a user to retrieve information from a back-end legacy system using a voice input according to an embodiment of the invention. To explain and illustrate the invention, FIG. 4 is discussed in connection with structure from FIG. 2 and the software configuration of FIG. 3. However, the method of FIG. 4 is not to be considered as limited to or constrained by the structure of FIG. 2 or the software configuration of FIG. 3 or any other structure/software configuration.

In step 405 the user logs onto the systems interface. For example, a technician using computer 200 (FIG. 2) may attempt a log-on via protocol server 240 (FIG. 2).

In step 410, a speech recognition application is launched or otherwise activated. For example, the voice recognition application can be launched as part of the computer start-up process. Alternatively, the speech recognition module 305 of FIG. 3 may be activated by a user when needed. If the speech recognition software is started at computer startup, the user is able to start the TechNet application as well as using speech recognition capabilities to input and receive data from TechNet application. For example, to get from one field to a next field, the user can say "TAB" to move the cursor to the next field. Similarly, to input data, the user can say "Enter" and then data will be entered. To go to a new screen or to move to a new page in the application, the user can say, for example, "Go To" and then state the page he wishes to go to. For example, the user can say "Cosmos Inquiry" to go to a page for searches.

In step 415, voice inputs are received. For example, speech recognition module 305 (FIG. 3) may receive voice inputs based on a technician speaking into voice input device 280 (FIG. 2).

In step 420, the voice inputs are converted to a request that can be processed by the systems interface. Step 420 may comprise speech recognition module 305 processing the voice inputs in order to correlate or interpret them in accordance with a client GUI. As discussed above for FIG. 3, a client GUI may present options for operations and/or data fields corresponding to an operation. According to step 420, speech recognition module 305 processes the voice inputs (e.g., by accessing a stored vocabulary) to select operations and to complete data fields. When all information necessary for a request has been received by the client application, the request is formatted so that it is ready for transmission to the systems interface.

In step 425, the request is sent to the systems interface (e.g., protocol server 240 and transaction server 250 of FIG. 2).

In step 430, the requested data is received. For example, the requested data may be received at the client application 310 (FIG. 3) of computer 200 (FIG. 2). Preferably, the requested data is received via the TechNet communications layer and formatted for display by the TechNet GUI layer.

In step 435, the received data is displayed on the GUI.

In step 440, the user may ask for a voice readout of the received data.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for permitting a user to remotely access data, comprising:

a systems interface to a plurality of legacy systems, the systems interface comprising a first server for managing protocol and a second server for generating legacy transactions, and a firewall that protects the first server and the second server, wherein the first server provides multiple operations that may be utilized for generating the legacy transactions;

a computer operable by the user to access data from the legacy systems through the systems interface, wherein the computer is programmed with a client application for accessing the systems interface, wherein the client application provides a graphical user interface that has a page for selecting one of the multiple operations provided by the protocol server for the client application, and has a page comprising a plurality of data fields for each of the multiple operations, wherein when an operation is selected, the corresponding page is displayed, and wherein the client application is adapted to format requests for information based on user input within one of the pages corresponding to one of the multiple operations;

a voice input device coupled to the computer for receiving spoken words as a voice input from a user;

a speech recognition application executing within the computer, the speech recognition application converting the voice input into data recognized by the client application; and a voice module operating within the speech recognition application that accesses a stored separate vocabulary for each of the pages for selecting and performing the multiple operations utilized for generating the legacy transactions on the legacy systems, wherein selecting the multiple operations comprises utilizing the voice input for navigating to a search page and selecting an operation for retrieving client account information, wherein performing the multiple operations comprises inputting the client account information based on the spoken words as the voice input to complete at least one of the plurality of data fields comprises utilizing the voice input to navigate among the plurality of data fields.

2. The system of claim 1, wherein the computer logs into the first server over a wireless communications network.

3. The system of claim 1, wherein the computer logs into the first server over a wireline communications network.

4. A system for permitting a user to remotely access data, comprising:

means for providing an interface to a plurality of legacy systems, wherein the means for providing an interface includes at least one firewall that protects the means for providing an interface from the legacy systems, wherein the means for providing an interface provides multiple operations that may be utilized for generating transactions with the legacy systems;

a computer operable by the user to retrieve data from the legacy systems by sending user requests to the means for providing an interface, wherein the computer includes a voice input device;

a communications link coupling the computer and the means for providing an interface;

a client software application executing within the computer, the client software application providing a graphical user interface that includes a page for selecting one of the multiple operations provided by the means for providing an interface for the client application and has a page for each of the multiple operations, wherein when an operation is selected the corresponding page is displayed; and a speech recognition software application for:
converting spoken words provided as a voice input into a user input, the speech recognition software application including a voice module that accesses a stored separate vocabulary for each of the pages for selecting the multiple operations utilized for generating the legacy transactions on the legacy systems, the stored vocabulary for each of the pages including a spoken Go To command and a spoken TAB command for navigating to a search page, performing the multiple operations utilized for generating the legacy transactions on the legacy systems, wherein performing the multiple operations comprises inputting the client account information based on the spoken words provided as the voice input to complete at least one of a plurality of data fields, and selecting an operation for retrieving client account information.

5. The system of claim 4, wherein the user requests are processed by the means for providing an interface in order to generate legacy transactions.

6. The system of claim 4, wherein the means for providing an interface comprises a protocol server and a transaction server.

7. The system of claim 4, wherein the protocol server receives the user requests and forwards the user requests to the transaction server, and wherein the transaction server generates legacy transactions based on the user requests, receives the requested information based on the legacy transactions, and forwards the requested information to the protocol server.

8. A system for remotely accessing legacy data from a plurality of legacy systems, comprising:

a voice input device;

a modem;

a systems interface in communication with the plurality of legacy systems wherein the systems interface is protected from the legacy systems by a firewall, and wherein the systems interface provides multiple operations that may be utilized for generating transactions with the legacy systems; and a computer, wherein the computer includes at least one memory programmed with software for performing the following:

providing a graphical user interface that has a page for selecting one of the multiple operations provided by the systems interface for the client application and has a page for each of the multiple operations wherein when an operation is selected the corresponding page is displayed, receiving a request to input by voice;

activating a speech recognition module in response to the request, the speech recognition module including a speech module that accesses a stored separate vocabulary for each of the pages for selecting and performing the multiple operations utilized for generating the legacy transactions on the legacy systems, wherein selecting the multiple operations comprises utilizing a Go To command in a speech input for navigating to a search page and selecting an operation for retrieving client account information, and wherein performing the multiple operations comprises inputting the client account information based on spoken words as a speech input to complete at least one of a plurality of data fields, wherein inputting the client account information to complete at least one of the plurality of data fields comprises utilizing a TAB command in the speech input to navigate among the plurality of data fields;

converting spoken words that are the speech inputs into a user request for information by using the separate vocabulary corresponding to the page that is displayed;

sending the user request for information to the systems interface; and receiving data responsive to the user request.

9. A method for allowing a user to access data, comprising:

logging onto a systems interface to legacy systems;

providing a graphical user interface that includes a page for selecting one of the multiple operations provided by the systems interface for the client application and includes a page for each of the multiple operations wherein when an operation is selected the corresponding page is displayed;

activating a speech recognition module in response to the request, the speech recognition module including a voice module that accesses a stored separate vocabulary for each of the pages for selecting and performing the multiple operations utilized for generating the legacy transactions on the legacy systems, wherein selecting the multiple operations comprises utilizing a spoken Go To command in a speech input for navigating to a search page and selecting an operation for retrieving client account information, and wherein performing the multiple operations comprises inputting the client account information based on spoken words as a voice input to complete at least one of a plurality of data fields, wherein inputting the client account information to complete at least one of the plurality of data fields comprises utilizing a TAB command in the voice input to navigate among the plurality of data fields;

receiving spoken words as the voice inputs from the user;

converting the voice inputs to a user request by using the separate vocabulary corresponding to the page that is displayed;

sending the user request to the systems interface; and receiving data from the systems interface in response to the user request.

10. The method of claim 9, further comprising the steps of:

receiving a request for input by speech; and activating the speech recognition module in response to the request for input by speech.

11. The method of claim 9, wherein the step of converting the voice inputs to a user request comprises converting the voice inputs to user inputs and converting the user inputs into the user request.

12. The method of claim 11, wherein the systems interface comprises a protocol server and a transaction server.

* * * * *